Oct. 24, 1950  R. F. STAMM  2,527,338
DIFFRACTION GRATING RULING ENGINE
Filed Oct. 12, 1946  2 Sheets-Sheet 1
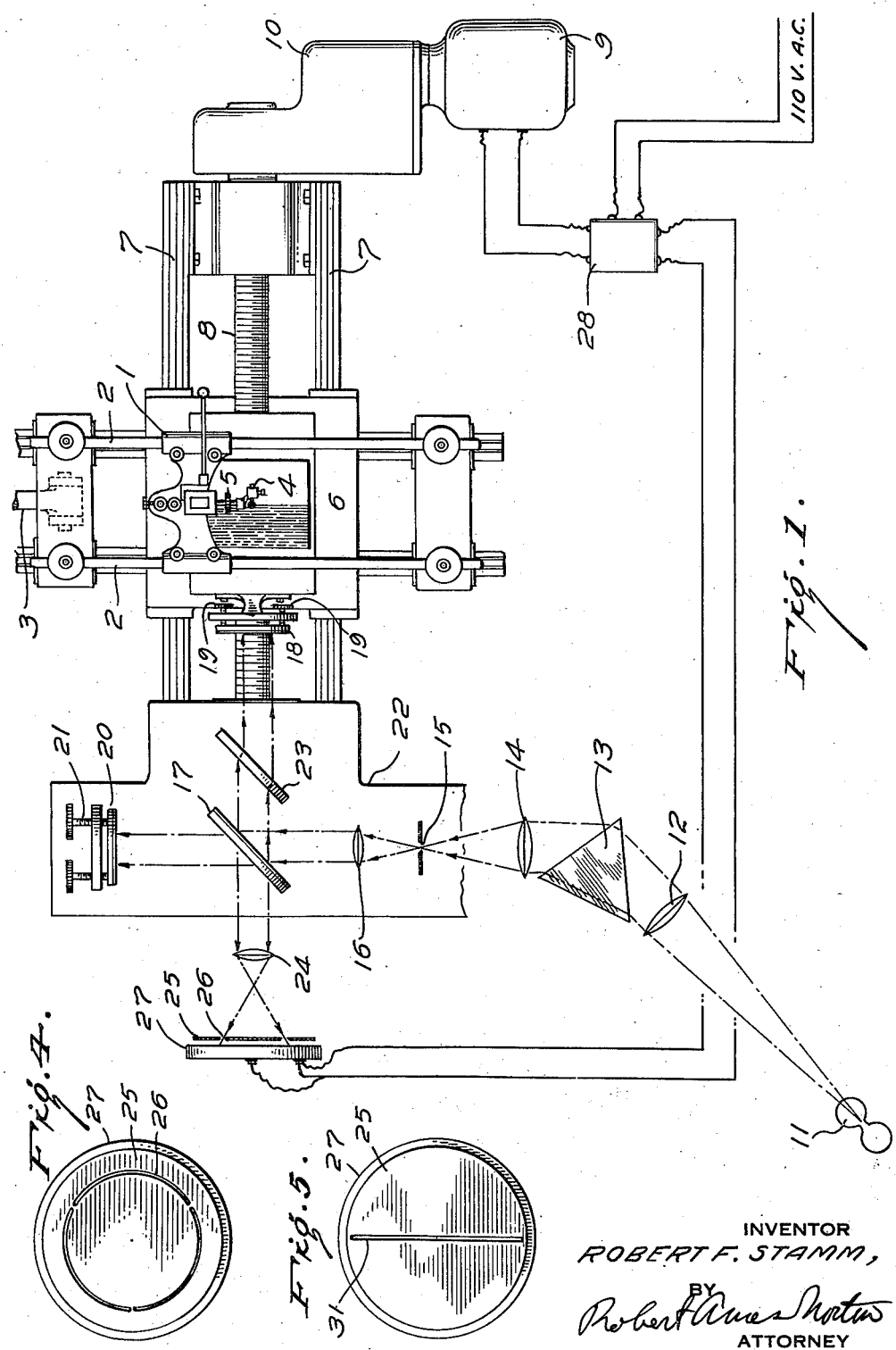
INVENTOR
ROBERT F. STAMM, Oct. 24, 1950 — R. F. STAMM — 2,527,338
DIFFRACTION GRATING RULING ENGINE
Filed Oct. 12, 1946 — 2 Sheets-Sheet 2
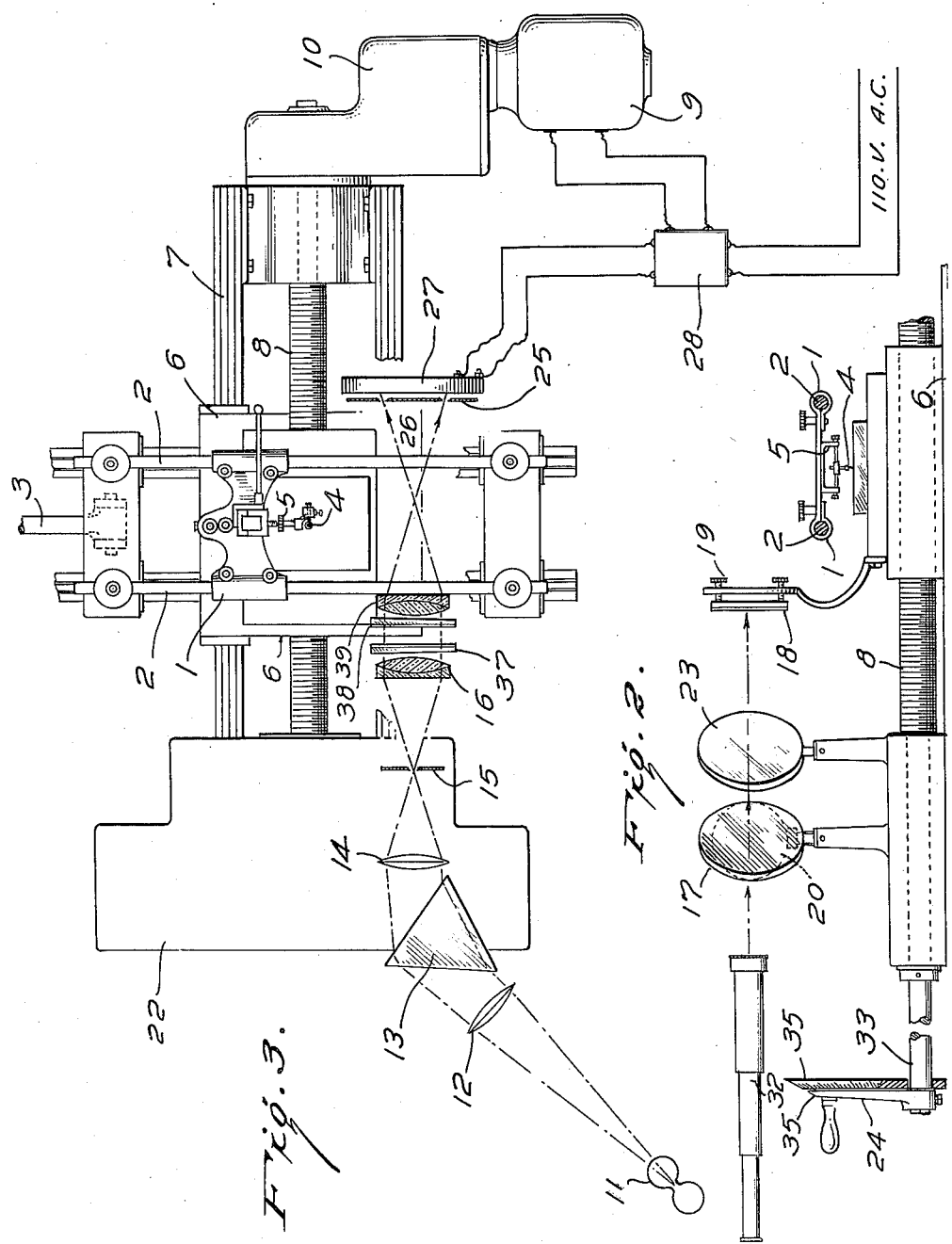
INVENTOR
ROBERT F. STAMM,
BY
ATTORNEY Patented Oct. 24, 1950

2,527,338

UNITED STATES PATENT OFFICE 2,527,338

DIFFRACTION GRATING RULING ENGINE

Robert F. Stamm, Stamford, Conn., assignor to American Cyanamid Company, New York, N. Y., a corporation of Maine Application October 12, 1946, Serial No. 702,967

13 Claims. (Cl. 33—32)

This invention relates to an improvement in ruling engines for ruling diffraction gratings, and particularly gratings with fine spacing.

In the past diffraction gratings have been ruled by engines which consist essentially of a reciprocating diamond cutter which is lifted on its return stroke and which moves in very accurately constructed parallel ways associated with a carriage or platform carrying the material on which the grating is to be cut, which moves in accurate parallel ways at right angles to the scribing mechanism. Since movement of the carriage between successive cuts of the scriber determines the spacing of the lines on the grating the accuracy of the grating, and particularly its freedom from secondary spectra or ghosts, is absolutely dependent on the accurate spacing between lines.

Since it is common to prepare finely spaced gratings with 15,000 lines to the inch, and even in some cases 30,000 the spacing is a matter of extreme precision. In ruling engines which have been used commercially in the past, the motion of the carriage on which the grating material rests has been effected by a very accurate screw of moderate pitch, e. g., 20 threads to the inch, provided with a very large ratchet head permitting rotation of the screw between cuts through accurately predetermined small angles. Unfortunately, it is not possible to design a screw of perfect accuracy combined with a mounting of equal accuracy. Normally, the mounting constitutes the limiting factor. As a result of slight inaccuracies in the travel of the carriage between cuts, it has not been particular hitherto to construct large gratings of high accuracy because errors in screw or mounting become multiplied when the length of the screw is increased, as in the case of large gratings. For this reason gratings even of satisfactory accuracy have normally been limited to about 6 inches and this size limitation has constituted a serious drawback because there is a demand for large gratings as well as small gratings of high accuracy, and hitherto gratings have represented compromise between size and acceptable accuracy.

The difficulty of the problem is discussed in many textbooks on theoretical physics, such as Studies in Optics by A. A. Michelson, pages 100, et seq. and Physical Optics by Robert W. Wood (3rd edition) pages 254 et seq. In the books, the proposals are made to use interference fringes for controlling the motion of grating carriages and Wood emphasizes that this would permit ruling small gratings to a high degree of perfection. Quite recently it has been proposed to use a Fabry-Perot interferometer to measure the spacing between lines cut on a grating. The proposal involved the use of lines of sodium as a source of monochromatic light. The yellow line of helium has also been tried.

It is with ruling engines using terferometric control of grating spacing that the present invention deals. The proposals to use interferometric devices for controlling the spacing of grating lines has been limited to very small gratings because the interference fringes lose their sharpness after a certain rather small size of grating is exceeded, and gratings of more than about two centimeters in width cannot be produced practically by these means.

According to the present invention I have found that the factors limiting the size of perfect or substantially perfect diffraction gratings which can be ruled with ruling engines controlled by interferometers result from the fact that the source of monochromatic light in the interferometer produces spectral lines which are broadened or which, while appearing grossly monochromatic, in fact show a fine structure or variation in the line itself.

Broadening is primarily due to three factors. The first is the Doppler effect resulting from the motion of the emitting atoms towards or away from the observer. This motion is a function of atomic weight and temperature. The lighter the atom and the higher the temperature the greater its average speed, and hence the greater the Doppler effect. The very low atomic weight of helium results in broad lines when it is used as a light source. The second and third factors result from crowding of the emitting atoms due to pressure. Increase in pressure exerts a broadening effect by itself because it broadens the energy levels involved in the initial and final states of the emitting atoms. Pressure also increases the number of collisions of atoms, which collisions also result in broadening of the emitted spectral line.

The second factor of fine structure within the apparently monochromatic line may have three theoretical causes. The first is the presence of isotopes, and the second and third are effects of magnetic and electrical fields on the radiating atom. In most practical light sources the last two factors are very small and may be considered negligible in comparison to the isotope effect, which is the principal contributing cause to fine structure within a spectral line.

According to the present invention we have found that if motion of grating carrier is controlled by an interferometer, using monochromatic line illumination substantially free from any fine structure in the line, it is possible to use in excess of a million interference fringes, and even in some cases almost twice that number. Since there are two interference fringes produced for a path length difference of one wave length, the maximum width of grating can be from half a million to one million wave lengths of the monochromatic light employed. This permits ruling gratings having widths of from 25 to 50 centimeters and which are substantially perfect, more perfect than the best small gratings which have been produced hitherto. Perfect gratings of this size are, of course, unknown and open up a new field of use for optical instruments using large gratings. Two common types of interferometers, the Michelson and Fabry-Perot, lend themselves particularly to grating ruling engines of the present invention. The Michelson type of interferometer is capable of ruling gratings approximately twice as large as can be ruled with a Fabry-Perot type. It can also be adjusted to produce either circular or substantially vertical interference fringes. The Fabry-Perot type, while limited to circular interference fringes, produces brighter and sharper ones and is somewhat more economical to build. The choice is largely influenced by the maximum size of grating to be produced.

While the present invention is capable of use with any source of monochromatic light producing lines substantially free from fine structure, I have found that the sources of such light which are practical are rather limited in number. It is possible to use the cadmium red line as a source of illumination for an interferometer. Even though cadmium occurs as a mixture of isotopes, the red line does not show any fine structure. In spite of the fact that the cadmium art requires operation at fairly high temperatures, the weight of the cadmium atom is sufficient so that broadening due to the Doppler effect is not serious up to gratings of the order of 25 centimeters in width (when using a Michelson interferometer). Although somewhat expensive in first cost, we find that the best sources of illumination are from monoisotopic mercury vapor discharge tubes or arcs. A readily available isotope of mercury, Hg 198, is obtained by neutron bombardment of gold. Other heavy monoisotopic gaseous discharge tubes may also be employed but they are not quite as efficient as the monoisotopic mercury lamp because the latter combines high atomic weight with low operating temperature, which makes Doppler broadening almost completely negligible. With monoisotopic mercury tubes, gratings approaching the extreme size of 50 centimeters in width become possible.

The Doppler broadening effect depends on the following equation:

$$I = i e^{-Bx^2}$$

in which $i$ is the maximum intensity of the interferometer fringe, $x$ is the distance from the center of the interference fringe in wave numbers, and $B$ is a constant determined by the following formula:

$$B = \beta \frac{c^2}{\nu_0^2}$$

where $\nu_0$ is the frequency of the radiation in cm.$^{-1}$, $c$ is the velocity of light, and $\beta$ equals $$\frac{\text{Atomic wt.}}{2RT}$$

$R$ and $T$ are the molar gas constant and absolute temperature respectively. Satisfactory sharpness of determination between interference fringes is obtained when the point half way between the bright fringe maxima does not have materially more than one half the light intensity at maxima. The means that at this point the value of $x$ must correspond to one fourth of the maximum intensity because at the mid-point light is obtained from both adjacent fringes. Actual intensity with a typical Fabry-Perot interferometer is slightly greater than the theoretical broadening due to the Doppler effect as a result of instrumental factors which increase the intensity about 10%. The following table gives calculations for radiation of the green line of monatomic mercury at different temperatures and for the red line of cadmium. All calculations are for the Fabry-Perot interferometer with mirror reflectivity of 0.9. The table gives values of $B$ and the corresponding maximum dimension of grating which can be ruled. With a Michelson interferometer greater dimensions are obtainable.

| Atom | Mass | T° K. | $\lambda$ (Å, air) | B | t(cm.) |
|---|---|---|---|---|---|
| Hg | 198 | 500 | 5,460.740 | 6,700 | 17.36 |
| Do | 198 | 393 | 5,460.740 | | |
| Do | 198 | 300 | 5,460.740 | 11,167 | 22.43 |
| Do | 198 | 273.2 | 5,460.740 | 12,262 | 23.51 |
| Cd | 112.41 | 573 | 6,438.472 | 4,393 | 14.05 |

The constant $B$ may be considered as a figure of merit for the particular light source. The larger the constant the bigger the grating which can be ruled. (In order to obtain large gratings with a Fabry-Perot interferometer, $B$ should be at least 4,000 for which figure $t=13.43$ cm.). It will be noted that at low temperatures the monatomic mercury source is much better than the red line of cadmium and permits gratings of about 23.5 cm. with a Fabry-Perot interferometer. The cadmium red line represents nearly the poorest source of light which is useful for large gratings. The Doppler effect constant $B$ will be used in the specification and claims as defined above and in no other sense.

The use of low pressure monoisotopic mercury discharge tubes presents a further advantage over some other source of line spectra in that the bright green line of mercury is not associated with closely adjacent lines. It is possible to isolate the green line by suitable filters which makes it unnecessary to use a monochromator and permits a somewhat simpler and cheaper construction. Other sources in which the line to be used is associated with adjacent lines of moderate intensity will often require a monochromator in order to assure that the unwanted lines are eliminated from the interferometer.

The present invention is concerned with the control of the motion of the carriage carrying the grating. The other elements of the ruling engine are not changed and operate precisely as before. This is an advantage of the present invention because it may be applied to grating ruling engines of standard design with very slight structural modification. Since ruling engines represent instruments of extraordinary precision, and hence high cost, the possibility of incorporating the improvements of the present invention in existing machines with a minimum of change is an important economic advantage.

When grating ruling engines are constructed from beginning in accordance with the present invention, considerable economy is possible in some of the elements. Thus, it is not necessary to employ carriage moving screws of maximum precision and the screw mounting may be much simpler. The interferometer spaces grating rulings in accordance with a predetermined number of wave lengths of the monochromatic light used, and this spacing is not affected by the precision of the carriage moving screw and mounting so long as they do not have gross play. The savings in this portion of the machine make up for a considerable portion of the additional cost of the interferometer elements, so that the improved grating ruling engines of the present invention can be constructed at a cost but little, if any, greater than the engines used hitherto which were incapable of ruling large perfect gratings.

In line with the general applicability to ruling engines the present invention operates with the same efficiency for flat and curved gratings. The same factors of good ruling engine practice and operation apply to engines embodying the present invention.

Two types of interferometric control lend themselves to the incorporation in instruments including the improvements of the present invention. The first type utilizes the interferometric principle as a measuring device, and the motion of the grating carriage is effected as before by manual operation of the carriage moving screw. The interferometric control is effected, for example in the Michelson type, by mounting one of the mirrors on the grating carriage, preferably at such a point that zero path length difference coincides with a scriber position substantially in the middle of the grating. Lines are then ruled, the spacing of lines being observed and checked by the interference fringes which are recombined into a telescope, as in the ordinary design of this type of interferometer. Circular fringes or linear fringes may be used, depending on whether the two mirrors of the interferometer are exactly at right angles to each other or slightly inclined.

The second method is an automatic one, in which the grating carriage is moved, for example, by an electric motor through a very high reduction gearing and screw, the starting and stopping of the motor being determined by a photoelectric cell located behind an aperture at a position where the interference beams are recombined. The machine can be set so that after one line is ruled the grating carriage will be moved a predetermined whole number of wave lengths of light, the motor being stopped when the chosen interference fringe strikes the aperture and its associated photocell. The circuits used in the actuation of the motor by the photocell are of known design and provide for stopping the motor at the point of maximum intensity of the fringe. Aperture shape and size and motor gearing are chosen to prevent excessive hunting.

The invention will be described in greater detail in connection with the drawings, in which:

Fig. 1 is a plan view of a ruling engine automatically controlled by a Michelson type interferometer;

Fig. 2 is an elevation of a portion of a modified engine according to Fig. 1 using manual control and interferometric measurement;

Fig. 3 is a plan view of a ruling engine automatically controlled by a Fabry-Perot type interferometer;

Fig. 4 is an elevation of a mask used in Figs. 1 and 3 provided with a circular slit, and Fig. 5 is an elevation of a similar mask using a vertical slit.

In the modification shown in Fig. 1 the ruling engine is provided with a scribing carriage 1 of conventional design moving in parallel ways 2 and being actuated by the customary reciprocating mechanism (not shown) through the rod 3. The carriage carries a diamond 4 mounted in the usual framework, provided with an adjusting screw 5. The design and operation of the scriber carriage is conventional and forms no part of the present invention.

The grating blank, concave, convex, or flat, is mounted on a carriage 6 moving in accurate, parallel ways 7 at right angles to the ways 2 and moved by a screw 8. This latter is driven by the motor 9 through high reduction gearing 10.

Spacing control between scriber cuts is effected by means of a Michelson type interferometer mounted on a stationary framework 22, using a line source of monochromatic light free from fine structure 11. This may, for example, be a monoisotopic mercury discharge tube. The light from the source passes through a monochromator containing lenses 12 and 14, a prism 13 and a vertical exit slit 15. The monochromator is adjusted in conventional manner by positioning of the prism so that a preselected spectral line, for example the green line in the case of mercury discharge tube, passes through the exit slit 15, which at the same time serves as an entrance slit to the interferometer proper. The beam from the slit 15 is collimated by the lens 16 and strikes an inclined half silvered mirror 17. Half of the light passes through the reflecting coating and is reflected back from the mirror 20 thus producing a virtual image of the mirror on the back of the semi-reflecting silvered surface of the mirror 17. The remaining portion of the original beam reflected from the silver passes through an inclined compensating parallel glass plate 23 of the same thickness and material as the glass plate of the mirror 17 and strikes a mirror 18, which is mounted on the carriage 6, and moves therewith. The direction of this beam is parallel to the direction of travel of the carriage 6. Mirrors 18 and 20 are accurately positioned by the adjusting screws 19 and 21 so that they are exactly at right angles to each other and to the axis of the beams striking them. This results in a recombining of the virtual image of the mirror 20 and the real image of the mirror 18 at the half silvered surface of the mirror 17, and the two beams are then imaged by the lens 24 onto a mask 25 provided with a circular slit 26. The circular interference fringes are produced and movement of the carriage 6 results in an ever-expanding set of circular fringes moving outward across the mask 25. The slit 26 is positioned so that normally it will be struck by the second or third interference fringe from the center. When the photocell 27 back of the mask 25 is not illuminated by the maximum energy of a bright interference fringe in the middle of the circular slit 26, the electronic relay 28 is actuated by the photocell current and it in turn causes the motor 9 to turn in such a direction that the maxium intensity of this fringe is centered exactly in the circular slit 26. The relay 28 is of known circuit design. In it is included a suitable step by step relay and switch of conventional design.

The operation of the ruling engine proceeds in normal manner, that is to say, the carriage 1 moves across the grating blank on the carriage 6, the diamond 4 burnishing a shallow groove in the blank. At the completion of this stroke the carriage is returned with the diamond elevated by the conventional drive (not shown). At this point the motor 9 starts and continues moving the carriage 6 until the motion of the mirror 18 has caused a predetermined number of bright interference fringes to pass over the aperture 26 of the mask 25. The number of fringes depends on the spacing desired and may, for example, be six fringes in the case of a grating which is to be ruled with a grating spacing of three wavelengths of the light used in the interferometer. When the last fringe has become centered for maximum intensity on the aperture 26, the motor 9 stops turning and the next travel of the carriage 1 causes a second line to be ruled by the diamond. The sequence of operations continues until the whole of the grating has been ruled.

The positioning of the mirrors 18 and 20 should be such that the point of zero path difference coincides substantially with a position of the diamond at the center of the grating blank. The carriage may then be swung over to either edge of the grating and the machine started. It is one of the advantages of the modification of the invention using a Michelson type of interferometer that the fringes on either side of zero light path difference may be employed, which permits ruling a grating to twice the dimensions of one ruled with an interferometer which can be used on only one side of the zero position. With a monoisotopic mercury light source it is possible to use nearly one million fringes on either side of the zero light path difference and a grating of maximum size can be ruled.

Fig. 5 shows a mask 25 provided with a central vertical slit 31 instead of a circular slit 26. This may be used in the machine of Fig. 1 by a slight adjustment of the mirrors 18 and 20 so that they are not quite at right angles to each other. Interference fringes then appear as a straight line for the fringe corresponding to zero path difference and as very slightly curved lines on either side. The operation of the machine is the same as described above except that the fringes now move transversely across the vertical slit as the carriage 6 is moved.

If it is desired, grating ruling can be effected by manual adjustment using the interferometer as a measuring instrument only. This modification is shown in Fig. 2, a telescope 32 replacing the mask 25 and photocell 27. The screw 8 is then turned manually by a shaft 33 provided with a crank 25 carrying an index pointer 35 moving over a circular scale 36.

In manual operation the engine rules a line on the grating and the crank 24 is then turned until the requisite number of interference fringes have passed the cross hair of the telescope 32, when another line is ruled. While substantially perfect gratings can be ruled by the manual modification of the present invention, this is not preferred, because it is slower and the danger of warping the grating or the engine by body heat makes it necessary for the operator to be located at a considerable distance from the carriage 6. The automatic operation of ruling engines incorporating the improvements of the present invention is economically far preferable.

Fig. 3 shows a ruling engine substantially similar to that of Fig. 1 but using a Fabry-Perot type of interferometer in place of a Michelson interferometer. The same parts bear the same numerals. The operation of the ruling carriage 1 with the cutting diamond 4 and the movement of the carriage 6 from cut to cut by means of the motor 9, gearing 10 and screw 8, is precisely the same as described in connection with Fig. 1. The interferometer design, however, is somewhat different, the light leaving the exit slit 15 being parallel to the screw 8 and not at right angles thereto. The light is collimated by a doublet lens 16 and passes through a very slightly wedge shaped piece of glass 37 rigidly connected with the framework 22 and then through a second glass wedge 38 mounted on the carriage 6. In the drawing the wedge angles are exaggerated. The emerging light with its circular interference fringes is then imaged by the lens 39 on a mask 25 provided with a circular aperture 26, which is of the same construction as shown in Fig. 4. A photocell 27 is mounted back of the mask and operates the motor 9 through the relay 28 in precisely the same manner as described in connection with Fig. 1.

The modification of Fig. 3 possesses the advantages of the Fabry-Perot interferometer, namely, brighter, narrower and sharper interference fringes, but is capable only of utilizing fringes on one side of the zero path difference point, because this point is approached when the flat surfaces of the wedges 37 and 38 are almost in contact. In order to prevent shock to the instrument the ruling of the grating is started with the carriage 6 moved over to its extreme position at the left, at which point the wedges 37 and 38 are almost in contact. The drawing shows the engine operating at approximately the center of the grating. The modification in Fig. 3 is, of course, subject to the disadvantages of the ordinary Fabry-Perot type of interferometer, namely that it permits gratings of only half the maximum size possible with the modification of Fig. 1.

The ways for the cutting carriage and grating blank carriage are shown in the drawings at right angles to each other, which is the usual design of ruling engine. It should be noted that it is in no sense necessary that the two ways be exactly at right angles to each other. They may be turned through any desired angle and the machine will continue to space the grating rulings accurately but the spacing will be changed. Instead of being equal to the displacement of the carriage between cuts it will now be equal to this displacement multiplied by the cosine of the angle of inclination of the ways. This permits changing spacing by a factor smaller than a whole fringe. For most gratings, such refinement is unnecessary but it is an advantage of the device of the present invention that accurately ruled gratings of infinitely variable line spacing can be produced wherever this is desirable and warrants the additional cost of providing cutting carriage and grating blank carriage ways which can be rotated with respect to each other.

In the claims the term "optical radiation" is used in a broad sense. It is not limited to radiation in the visible spectrum alone but includes the infrared and ultraviolet, the radiation of which obeys optical laws and behaves in a manner substantially similar to visible radiation. The term will not be used in any other more restricted sense.

The interferometers produce narrow, bright fringes separated by dark fringes. The dark fringes have a point of minimum illumination which is definite. It is therefore possible to operate the ruling engines of the present invention either from the light fringes or the dark fringes, using suitable aperture dimensions. Of course, if dark fringes are to be used, the relay must be set for minimum current instead of maximum current from the radiation detector. The term "fringes" in the claims will be used to cover either bright fringes or dark fringes. When using certain types of interferometers, such as the Fabry-Perot, there is an advantage in working with the bright fringes because of their narrower width, and hence sharper maximum. In the case of a Michelson type interferometer there is little to choose between the bright and dark fringes. I prefer to use bright fringes with instruments where they are sharper than the dark fringes, but the invention is not intended to be limited to their use.

I claim:

1. In a grating ruling engine comprising means for reciprocating a ruling cutter, a movable carriage adapted to carry a grating blank, movable under said reciprocating cutter, the improvement which comprises electrically driven means for moving the carriage between cutting strokes of the cutter, an interferometer illuminated with a light source capable of emitting a narrow spectral line substantially free from fine structure and having a Doppler broadening constant B at least 4,000, said interferometer containing a movable reflecting element, said movable reflecting element being mounted on the grating blank carriage and movable therewith, the reflecting element being positioned so that the motion of the carriage moves it in a direction to change one of the light paths in the interferometer, a radiation detector capable of transforming optical radiation into electrical currents, a mask in front of said detector provided with an aperture of shape substantially identical with that of the interference fringes produced by the interferometer, means for imaging the fringes on said mask in positions parallel to the aperture, said fringes moving transversely across the aperture with motion of the grating carriage, and relay means actuated by the detector current and controlling the operation of the electrically driven means for the carriage, said relay means being responsive to detector current corresponding to maximum energy of periodically predetermined fringes of the interferometer to cause the electric driving means to move the carriage to a position at which the periodically predetermined fringe is centered in the aperture, whereby the grating carriage is automatically moved between cuts an amount equal to half the path difference for a predetermined whole number of interference fringes.

2. In a grating ruling engine comprising means for reciprocating a ruling cutter, a movable carriage adapted to carry a grating blank, movable under said reciprocating cutter, the improvement which comprises means for moving the carriage between cutting strokes of the cutter, said means comprising a screw electrically driven through a high speed reduction gearing, an interferometer illuminated with a light source capable of emitting a narrow spectral line substantially free from fine structure and having a Doppler broadening constant B at least 4,000 and containing a movable reflecting element, said movable reflecting element being mounted on the grating blank carriage and movable therewith, the reflecting element being positioned so that the motion of the carriage moves it in a direction to change one of the light paths in the interferometer, a radiation detector capable of transforming radiation into electrical currents, a mask in front of said detector provided with an aperture of shape substantially identical with that of the interference fringes produced by the interferometer, means for imaging the fringes on said mask in positions parallel to the aperture, said fringes moving transversely across the aperture with motion of the grating carriage, and relay means actuated by the detector current and controlling the operation of the electrically driven means for the carriage, said relay means being responsive to detector current corresponding to maximum energy of periodically predetermined fringes of the interferometer to cause the electric driving means to move the carriage to a position at which the periodically predetermined fringe is centered in the aperture, whereby the grating carriage is automatically moved between cuts an amount equal to half the path difference for a predetermined whole number of interference fringes.

3. In a grating ruling engine comprising means for reciprocating a ruling cutter, a movable carriage adapted to carry a grating blank, movable under said reciprocating cutter, the improvement which comprises electrically driven means for moving the carriage between cutting strokes of the cutter, a Michelson interferometer illuminated with a light source capable of emitting a narrow spectral line substantially free from fine structure and having a Doppler broadening constant B at least 4000, said interferometer containing a movable reflecting element, said movable reflecting element being mounted on the grating blank carriage and movable therewith, the reflecting element being positioned so that the motion of the carriage moves it in a direction to change one of the light paths in the interferometer, a radiation detector capable of transforming optical radiation into electrical currents, a mask in front of said detector provided with an aperture of shape substantially identical with that of interference fringes produced by the interferometer, means for imaging the fringes on said mask in positions parallel to the aperture, said fringes moving transversely across the aperture with motion of the grating carriage, and relay means actuated by the detector current and controlling the operation of the electrically driven means for the carriage, said relay means being responsive to detector current corresponding to maximum energy of periodically predetermined fringes of the interferometer to cause the electric driving means to move the carriage to a position at which the periodically predetermined fringe is centered in the aperture, whereby the grating carriage is automatically moved between cuts an amount equal to half the path difference for a predetermined whole number of interference fringes.

4. In a grating ruling engine comprising means for reciprocating a ruling cutter, a movable carriage adapted to carry a grating blank, movable under said reciprocating cutter, the improvement which comprises means for moving the carriage between cutting strokes of the cutter, said means comprising a screw electrically driven through a high speed reduction gearing, a Michelson interferometer illuminated with a light source capable of emitting a narrow spectral line substantially free from fine structure and having a Doppler broadening constant B at least 4000 and containing a movable reflecting element, said movable reflecting element being mounted on the grating blank carriage and movable therewith, the reflecting element being positioned so that the motion of the carriage moves it in a direction to change one of the light paths in the interferometer, a radiation detector capable of transforming radiation into electrical currents, a mask in front of said detector provided with an aperture of shape substantially identical with that of the interference fringes produced by the interferometer, means for imaging the fringes on said mask in positions parallel to the aperture, said fringes moving transversely across the aperture with motion of the grating carriage, and relay means actuated by the detector current and controlling the operation of the electrically driven means for the carriage, said relay means being responsive to detector current corresponding to maximum energy of periodically predetermined fringes of the interferometer to cause the electric driving means to move the carriage to a position at which the periodically predetermined fringe is centered in the aperture, whereby the grating carriage is automatically moved between cuts an amount equal to half the path difference for a predetermined whole number of interference fringes.

5. In a grating ruling engine comprising means for reciprocating a ruling cutter, a movable carriage adapted to carry a grating blank, movable under said reciprocating cutter, the improvement which comprises electrically driven means for moving the carriage between cutting strokes of the cutter, a Fabry-Perot interferometer illuminated with a light source capable of emitting a narrow spectral line substantially free from fine structure and having a Doppler broadening constant B at least 4000, said interferometer containing a movable reflecting element, said movable reflecting element being mounted on the grating blank carriage and movable therewith, the reflecting element being positioned so that the motion of the carriage moves it in a direction to change one of the light paths in the interferometer, a radiation detector capable of transforming optical radiation into electrical currents, a mask in front of said detector provided with an aperture of shape substantially identical with that of the inerference fringes produced by the interferometer, means for imaging the fringes on said mask in positions parallel to the aperture, said fringes moving transversely across the aperture with motion of the grating cariage, and relay means actuated by the detector current from the bright interference fringes and controlling the operation of the electrically driven means for the carriage, said relay means being responsive to detector current corresponding to maximum energy of periodically predetermined fringes of the interferometer to cause the electric driving means to move the carriage to a position at which the periodically predetermined fringe is centered in the aperture, whereby the grating carriage is automatically moved between cuts an amount equal to half the path difference for a predetermined whole number of interference fringes.

6. In a grating ruling engine comprising means for reciprocating a ruling cutter, a movable carriage adapted to carry a grating blank, movable under said reciprocating cutter, the improvement which comprises means for moving the carriage between cutting strokes of the cutter, said means comprising a screw electrically driven through a high speed reduction gearing, a Fabry-Perot interferometer illuminated with a light source capable of emitting a narrow spectral line substantially free from fine structure and having a Doppler broadening constant B at least 4,000 and containing a movable reflecting element, said movable reflecting element being mounted on the grating blank carriage and movable therewith, the reflecting element being positioned so that the motion of the carriage moves it in a direction to change one of the light paths in the interferometer, a radiation detector capable of transforming radiation into electrical currents, a mask in front of said detector provided with an aperture of shape substantially identical with that of the interference fringes produced by the interferometer, means for imaging the fringes on said mask in positions parallel to the aperture, said fringes moving transversely across the aperture with motion of the grating carriage, and relay means actuated by the detector current from the bright interference fringes and controlling the operation of the electrically driven means for the carriage, said relay means being responsive to detector current corresponding to maximum energy of periodically predetermined fringes of the interferometer to cause the electric driving means to move the carriage to a position at which the periodically predetermined fringe is centered in the aperture, whereby the grating carriage is automatically moved between cuts an amount equal to half the path difference for a predetermined whole number of interference fringes.

7. A ruling engine according to claim 1 in which the source of illumination for the interferometer is an emitter utilizing gaseous atoms of monoisotopic mercury as the emitting agents.

8. A ruling engine according to claim 2 in which the source of illumination for the interferometer is an emitter utilizing gaseous atoms of monoisotopic mercury as the emitting agents.

9. A ruling engine according to claim 3 in which the source of illumination for the interferometer is an emitter utilizing gaseous atoms of monoisotopic mercury as the emitting agents.

10. A ruling engine according to claim 4 in which the source of illmination for the interferometer is an emitter utilizing gaseous atoms of monoisotopic mercury as the emitting agents.

11. A ruling engine according to claim 5 in which the source of illumination for the interferometer is an emitter utilizing gaseous atoms of monoisotopic mercury as the emitting agents.

12. A ruling engine according to claim 6 in which the source of illumination for the interferometer is an emitter utilizing gaseous atoms of monoisotopic mercury as the emitting agents.

13. A ruling engine according to claim 1 in which the interferometer is illuminated with the red line of the cadmium spectrum.

ROBERT F. STAMM.

REFERENCES CITED

The following references are of record in the file of this patent:

UNITED STATES PATENTS

| Number | Name | Date |
|---|---|---|
| 1,331,966 | Phinney et al. | Feb. 24, 1920 |
| 1,455,795 | Logan | May 22, 1923 |
| 1,558,513 | Souder | Oct. 27, 1925 |

OTHER REFERENCES

Wood, "Physical Optics," third edition, 1936, page 254 et seq., page 298.

Michelson, "Studies in Optics," 1927, page 100 et seq., page 46 et seq.